(No Model.)  3 Sheets—Sheet 1.
W. BUTTLER.
MANUFACTURE OF GLASSWARE.
No. 592,078. Patented Oct. 19, 1897.
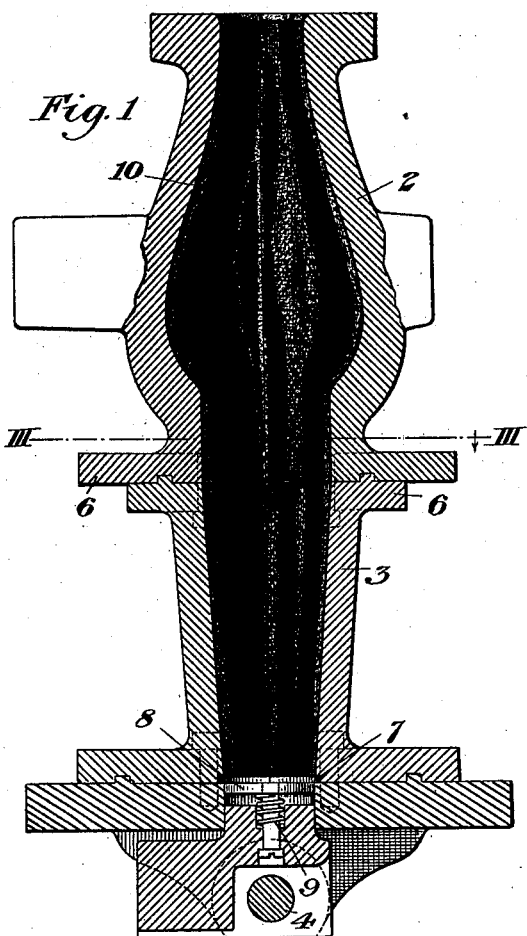
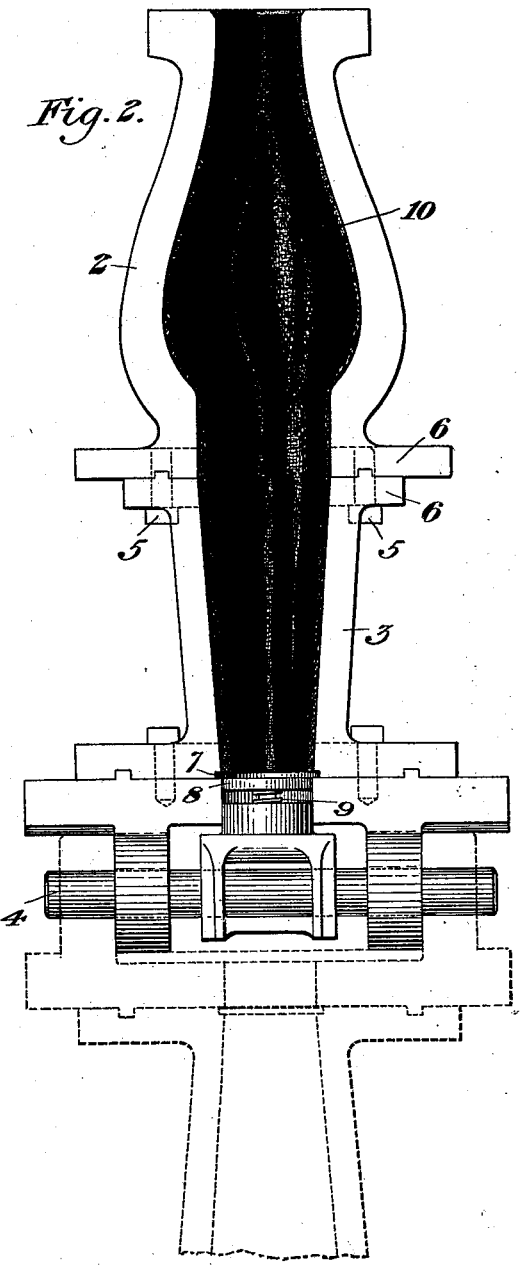
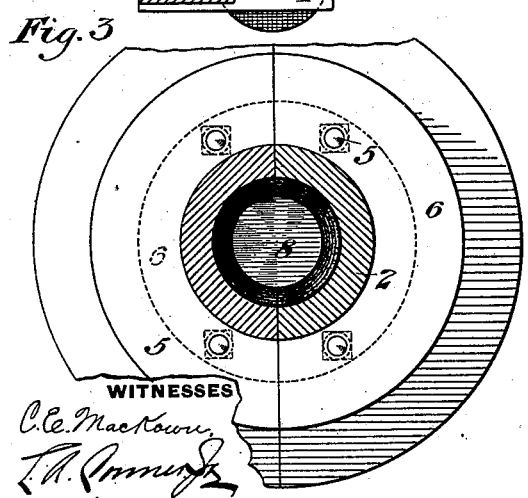
WITNESSES
INVENTOR
William Buttler
by Bakewell & Bakewell
his Attorneys.

(No Model.) 3 Sheets—Sheet 2.
W. BUTTLER.
MANUFACTURE OF GLASSWARE.
No. 592,078. Patented Oct. 19, 1897.
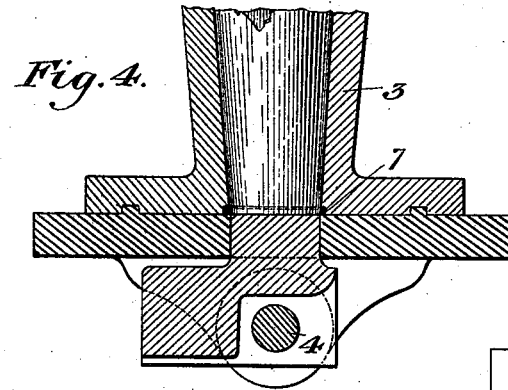
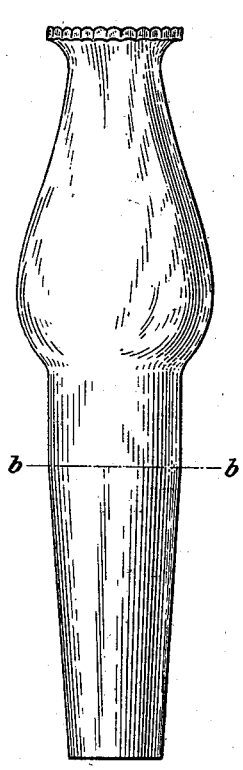
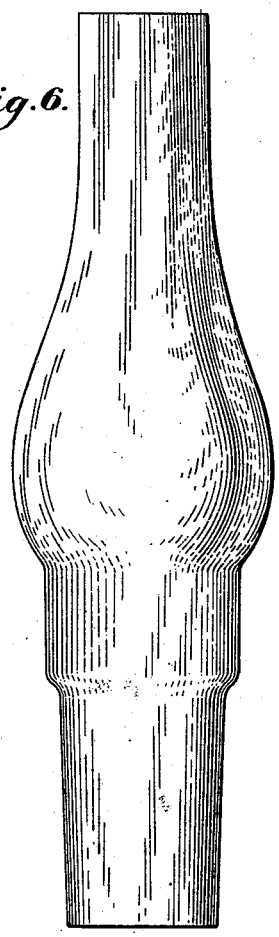
WITNESSES
INVENTOR
William Buttler
by Bakewell & Bakewell
his Attorneys.

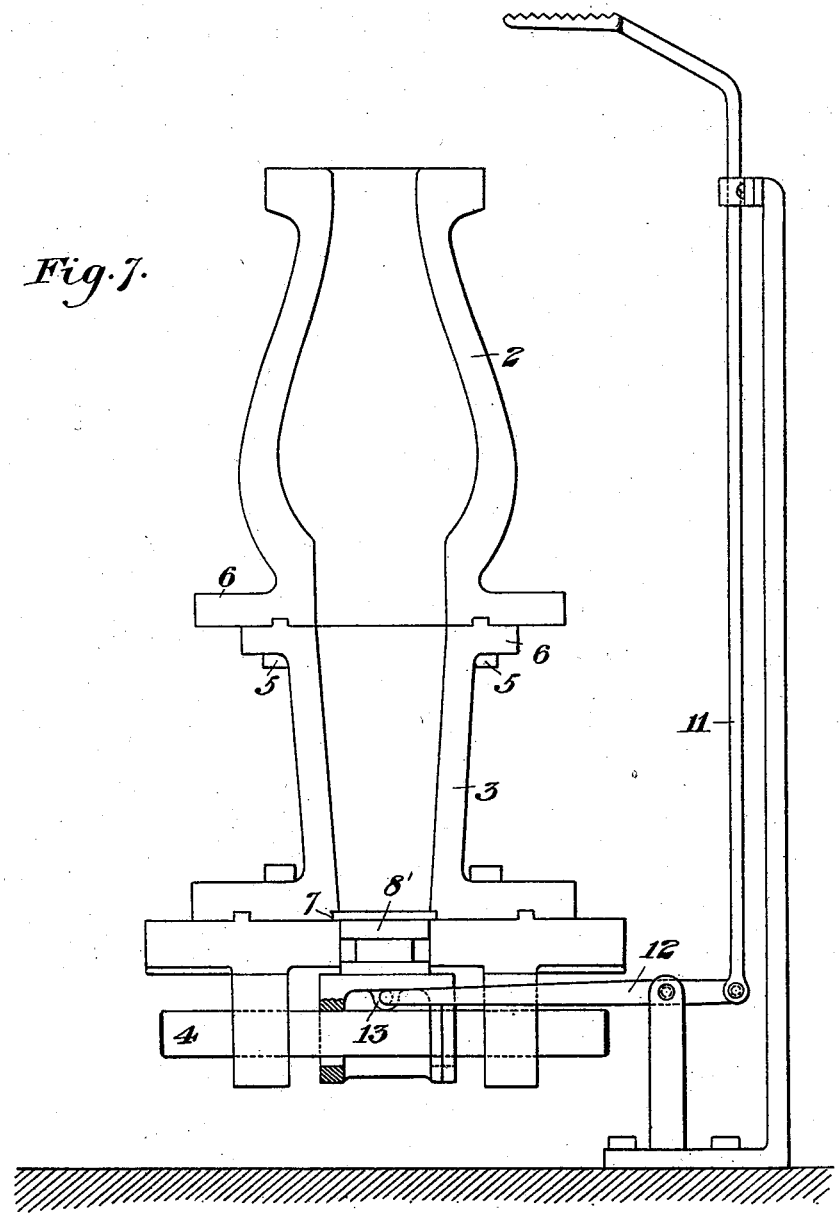

UNITED STATES PATENT OFFICE.

WILLIAM BUTTLER, OF REDKEY, INDIANA.

MANUFACTURE OF GLASSWARE.

SPECIFICATION forming part of Letters Patent No. 592,078, dated October 19, 1897.

Application filed January 11, 1897. Serial No. 618,687. (No model.)

*To all whom it may concern:*

Be it known that I, WILLIAM BUTTLER, of Redkey, in the county of Jay and State of Indiana, have invented a new and useful Improvement in the Manufacture of Glassware, of which the following is a full, clear, and exact description, reference being had to the accompanying drawings, forming part of this specification, in which—

Figure 1 shows in vertical axial section a glass-mold constructed in accordance with my invention. Fig. 2 is a similar view, the section being in the vertical plane of parting of the mold and at right angles to the section-plane of Fig. 1. Fig. 3 is a horizontal sectional plan view, the section being on the line III III of Fig. 1. Fig. 4 is a vertical section of the lower part of the mold, illustrating a modified construction. Figs. 5 and 6 show in side elevation compound blanks formed in my improved mold; and Fig. 7 is a side elevation, partly in section, of another modified form of mold.

As shown in Figs. 1 and 2, the mold is composed of two parts 2 and 3, fitted together end to end and adapted to form a compound glass blank, comprising two articles joined at their ends and separable transversely, one article being a lamp-chimney or similar article which is open at both ends, and the other being a tumbler or like article. Each mold part is divided vertically, and the lower sections 3 3 are hinged together at 4, so that the compound mold can be opened and closed. The sections 3 are secured, respectively, to their companion sections 2 by bolts 5, passing through flanges 6. By thus making the upper part of the mold in sections separable from the sections of the lower part either part may be changed so as to provide for the manufacture of glass articles of various sizes and shapes.

For the purpose of forming the lower portion of the article with a square end and avoiding the formation of rounded edges, which would impair the value of the article, I have invented the following improvement, which may be used not only in molds for forming compound blanks, but in molds which are shaped for blowing single articles, such as tumblers, &c. This improvement consists in forming at the lower end of the mold-cavity, at the place where the base of the article is formed, a peripheral circular groove 7. When the article is blown, the glass will not enter this groove so as to form a ridge on the article, but, by reason of the presence of steam or air in the groove, will be shaped with a square and symmetrical edge. To effect this result more perfectly, I provide the mold with a vertically-movable bottom plate or block 8. In Figs. 1 and 2 this is shown as upheld by a spring 9, normally in the position shown in Figs. 1 and 2, but which can be moved downwardly slightly by compression. When the glass is first blown into the mold, the lower end engaging the bottom plate or block 8 will cause it to yield downwardly somewhat until, when the blowing of the article is nearly finished, the workman blows less strongly through the punty, and the spring will react, and pressing the bottom plate or block upwardly will assist in squaring up and shaping the end of the article. This part of my invention may be employed without the grooves 7. In Fig. 7, however, I show my preferred form of movable bottom, this bottom 8' being lifted positively by the operator by means of a vertically-sliding foot-presser 11, pivotally connected to a lever 12, having a pin passing through a lug 13 in the bottom. By this construction the operator can move up the bottom during the blowing and insure a square bottom to the article. I consider myself the first to employ this movable bottom, which is moved up during the blowing, and desire to cover the same broadly, whether moved by a spring or by positive mechanism, and whether the mold is rotated or not.

In blowing glass articles in the compound mold 2 3 I rotate the blank in the mold by turning the punty and thus secure articles without external vertical seams. For this purpose I coat the interior of the mold with a paste lining 10. After each blowing operation the mold is opened by moving outwardly and downwardly one of the vertical divisions thereof, as shown by dotted lines in Fig. 2, whereupon the mold may be sprayed with water in order to prepare it for the formation of another article. The compound blank when taken from the mold is separated on the line $b\ b$, Fig. 5, and the separated ends suitably finished by appropriate means. As shown in Figs. 5 and 6, the lower portion of the compound blank which constitutes the tumbler is of uniformly less diameter throughout than the upper portion.

In Fig. 4 I show a modified construction of mold, in which the circular groove is used without the spring-backed bottom plate.

Within the scope of my invention as defined in the claims many changes in the form and construction of the parts may be made by the skilled mechanic, since

What I claim is—

1. A mold for blowing hollow glass articles having bottoms, said mold having at the bottom end of the matrix-cavity proper a small peripheral groove opening into the matrix-cavity proper and arranged to square up the bottom end of the article.

2. A mold for blowing hollow glass articles, having at the end portion a peripheral groove opening into the mold-cavity for squaring the end of the article blown therein, and having a movable bottom plate or block.

3. A mold for forming hollow glass articles having bottoms, said mold having a movable bottom, and means for moving said bottom upwardly during the blowing, to square up the bottom of the article.

4. The method of forming hollow glass articles having bottoms, consisting in blowing the same and moving the bottom of the article upward during the blowing, to square up the same.

5. The method of forming hollow glass articles having bottoms, consisting in blowing the same, rotating the article to shape it exteriorly, and moving the bottom of the article upwardly during the blowing to square up the same.

In testimony whereof I have hereunto set my hand.

WILLIAM BUTTLER.

Witnesses:
G. I. HOLDSHIP,
H. M. CORWIN.